Dec. 20, 1938.   C. A. GREEN   2,140,909
GREASE DISPENSING APPARATUS
Filed Nov. 11, 1935   2 Sheets-Sheet 1
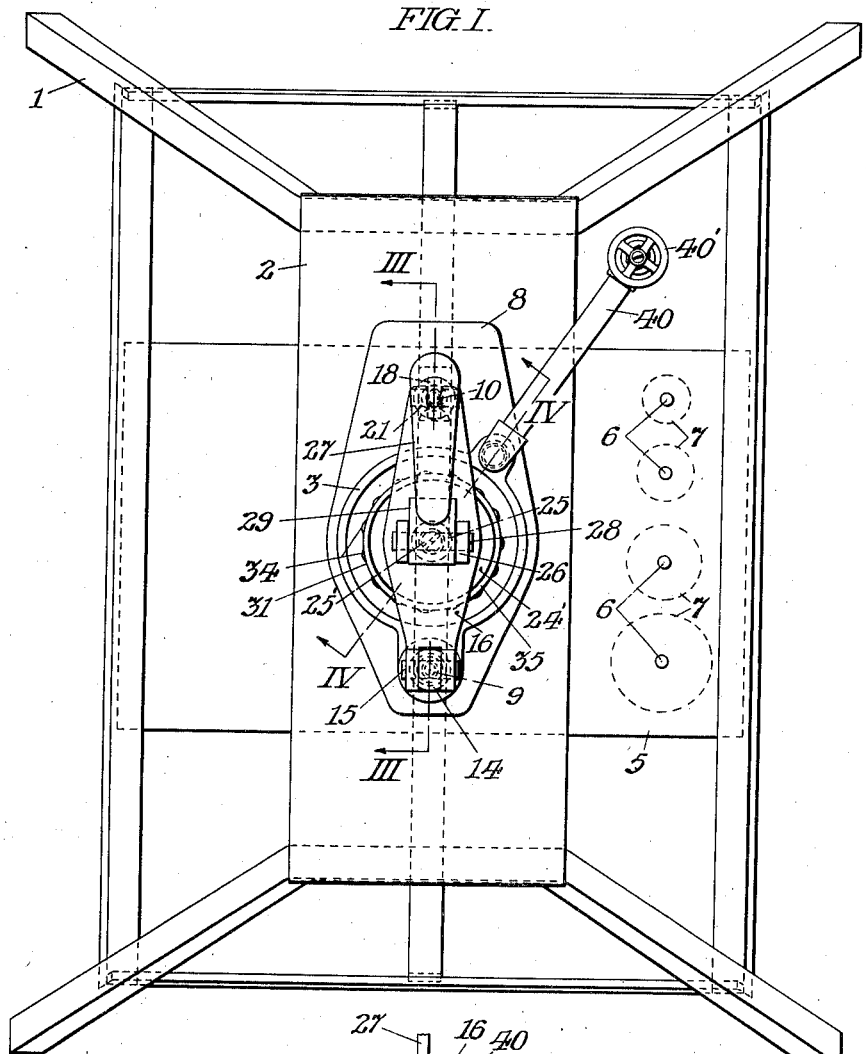
FIG. I.
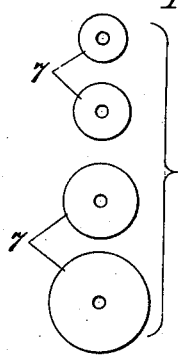
FIG. V.
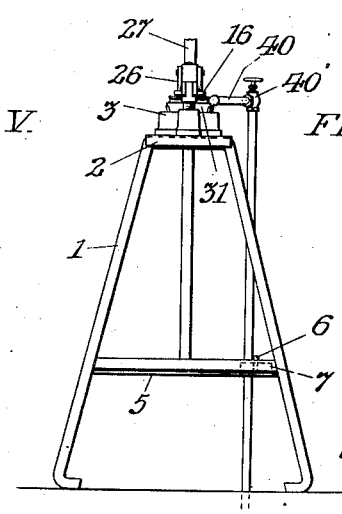
FIG. II.
INVENTOR:
CHARLES A. GREEN,
BY

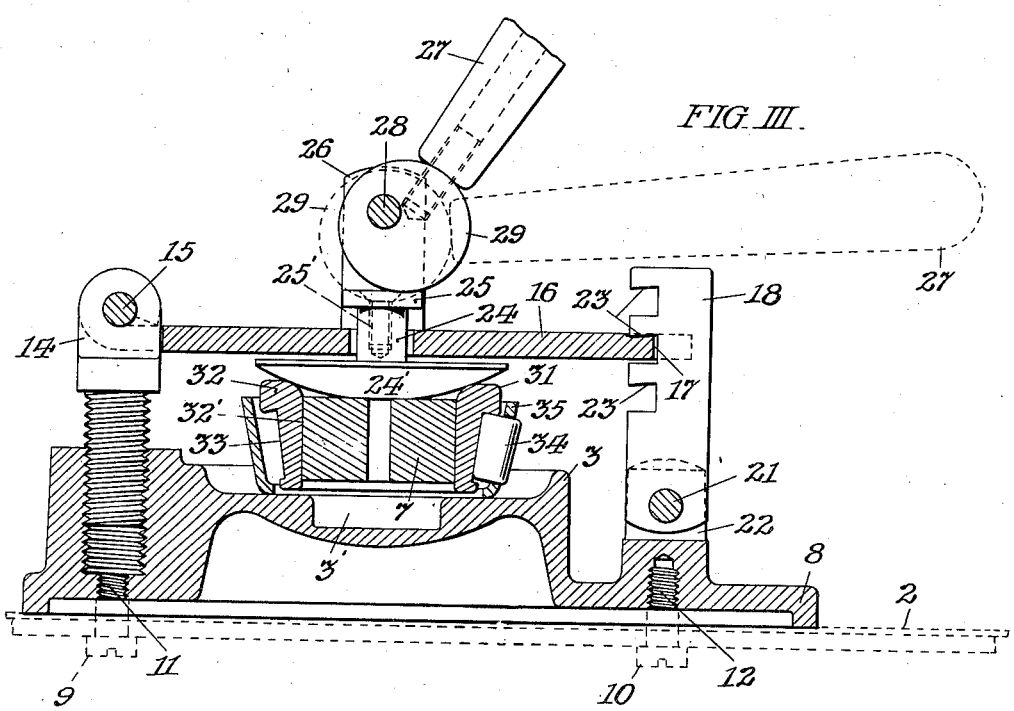

Patented Dec. 20, 1938

2,140,909

UNITED STATES PATENT OFFICE 2,140,909

GREASE DISPENSING APPARATUS

Charles A. Green, Philadelphia, Pa.

Application November 11, 1935, Serial No. 49,215

18 Claims. (Cl. 184—1)

It is the object and effect of my invention to provide an apparatus in which bearings for the shafts of automobile wheels and other shafts may be conveniently charged with grease or similar lubricant without waste of the latter.

The form of my invention chosen for illustration is particularly designed for automobile service and is adapted to readily receive and charge bearings of different diameters. Said apparatus includes a seat in which a bearing of any size within the range of the apparatus may be received and held while being lubricated. Said seat is provided with a lubricant inlet with which a source of supply of lubricant may be connected by a detachable fitting, for instance, such a fitting as is provided upon the end of a flexible grease dispensing conduit appurtenant to apparatus of the Alemite and Zerk types. Said conduit admits lubricant to said seat so as to charge it under pressure into the bearing held in the seat. In order to prevent discharge and waste of lubricant through the axial openings of such bearings, I provide a series of plugs of different sizes to fit the axial openings of the sizes of bearings within the range of the apparatus, which plugs may be selectively employed by the operator for successive charging operations. As hereinafter described, I provide means for locking the bearings of different sizes in said seat during the charging operations, including a locking bar which is hingedly connected with the support for the seat and in cooperative relation with a latch and a cam lever.

My invention includes the various novel features of construction and arrangement hereinafter more definitely specified.

In said drawings,

Fig. I is a plan view of apparatus conveniently embodying my invention.

Fig. II is an elevation of said apparatus as seen from the lower side of Fig. I.

Fig. III is a longitudinal sectional view taken on the line III, III in Fig. I in the direction of the arrows on said line and diametrically with respect to the seat; the cam lever being shown in elevation.

Fig. IV is a fragmentary sectional view taken on the line IV, IV in Fig. I through the axis of the seat and the lubricant inlet conduit.

Fig. V is a plan view of a group of bearing plugs of different sizes.

In said figures, the stand 1, conveniently formed of wrought sheet metal, includes the top plate 2 which supports the bearing seat 3. The shelf 5 supports a plurality of vertically extending axial studs 6 for respectively receiving and detachably holding the bearing plugs 7 of different sizes. Said shelf may also be conveniently employed to support a plurality of bearings to be charged, tools, etc.

Said seat 3 is conveniently formed as a single casting in unitary relation with the flange 8 and is conveniently rigidly attached to said top plate 2 by screws 9 and 10 respectively in threaded engagement with the screw sockets 11 and 12 in said flange 8. Said socket 11 is also adapted to receive at the upper end thereof the hinge bolt 14 which may be vertically adjusted therein by turning it. The upper end of said bolt 14 is hingedly connected by the pin 15 with the locking bar 16 which extends over said seat 3 and has the notch 17 to receive the latch 18. Said latch is pivotally connected by the pin 21 with the lug 22 on said seat flange 8, and has a verically extending series of notches 23 which may be selectively engaged with said locking bar 16.

Said locking bar 16 carries, in position to be presented in coaxial relation with said seat 3, the plunger 24 which has the collar 25 at its upper end held thereon by the screw 25' and has at its lower end the head 24' extending below said bar. Said plunger is loosely supported for axial reciprocation in said bar between the bifurcations of the lug 26. Said lug is conveniently formed in integral relation with said bar and supports between its bifurcations the cam lever 27 which is fulcrumed on the pin 28 fixed in said lug 26 in eccentric relation with the circular cam end 29 of said lever 27. Said lever serves as a handle for turning said cam to thrust said plunger 24 downwardly to clamp upon said seat 3 any bearing 31 which it is desired to charge with lubricant.

The bearing 31 illustrated is of an ordinary roller type, commonly employed for journaling automobile wheels upon their supporting shafts. Such a bearing includes the race ring 32 which has the axial opening 32' for fitting upon a shaft and has the circumferential recess 33 for engaging the conical bearing rollers 34 which are held in circumferentially spaced relation by the spacing ring 35 so that said rollers are loosely held in position for engagement of their outer surfaces with a corresponding conical seat in an automobile wheel or other thing which is to be journaled on said bearing.

In the form shown, the entire bearing 31 is supported upon said seat 3 by contact of the lower edge of its spacing ring 35 with said seat in coaxial relation with the lubricant inlet port 3' in said seat. The inlet conduit 36 extends from said port to the valve fitting 37, and is controlled by the spring pressed check valve 37'. Said fitting is conveniently screwed into the edge of said seat and a movable lubricant supply conduit 39 may be detachably connected therewith, if the apparatus is to be portable. However, if the apparatus is to be a fixture, the rigid conduit 40 controlled by the stop valve 40', may be substituted for the fitting 37 and connected with any suitable source of supply of lubricant under pressure, for instance, a tank containing compressed air above a body of lubricant.

In either case, the lubricant conduit leading to the port 3' is valve controlled; the valve 37' serving to prevent the lubricant from oozing back through the fitting 37 when the supply conduit 39 is detached therefrom at the end of a lubricating operation, and the valve 40', when closed, serving to prevent passage of the lubricant in either direction through the supply conduit 40.

When thus placed upon said seat, a bearing plug 7 of the proper size is placed in the axial opening 32' of the bearing ring 32 to serve as a closure for said opening to prevent the escape of lubricant during the charging operation. Said head 24' of the plunger 24 fits and bears upon the upper edge of said opening 32' and also bears axially upon the upper end of the selected plug 7.

It is to be understood that said bolt 14 may be adjusted axially to hingedly support said locking bar 16 at different heights above said seat 3 for selective engagement with the respective notches 23 in the latch 18 to receive bearings 31 of different axial length. The coarse adjustment thus effected is supplemented by the fine adjustment which may be effected by turning the cam lever 27 to lock, in rigid relation with said seat, any selected bearing within the range of axial and diametrical sizes for which the apparatus is proportioned, and thus hold such bearing during the charging operation.

When held upon the seat 3 as aforesaid, the bearing 31 is charged with grease, or other lubricant, in the space between the race ring 32 and the spacing ring 35, and between the adjoining rollers 34 until the operator observes the lubricant exuding from the exterior of the bearing. Thereupon, the operator upturns the cam lever 27 to release said plunger 24 from its clamped position upon the bearing 31, whereupon, the latch 18 may be swung aside from the locking bar 16 and the latter upturned upon its hinge connection with the bolt 14 to remove the charged bearing and substitute another to be charged, by a repetition of the operation above described.

However, it is to be understood that I do not desire to limit myself to the precise details of construction and arrangement herein set forth, as it is obvious that various modifications may be made therein without departing from the essential features of my invention, as defined in the appended claims.

I claim:

1. In a lubricant dispensing apparatus; a seat affording a plane support for a bearing to be lubricated, and having a lubricant inlet port; a lubricant supply conduit extending radially from said port to the exterior of said seat, for communication with a source of lubricant under pressure remote from said seat; a loose plug for closing the end of the bearing remote from said seat; and means for clamping said bearing and plug in cooperative relation with said seat.

2. In a lubricant dispensing apparatus; a seat affording a plane support for a bearing to be lubricated, and having a lubricant inlet port; a lubricant supply conduit extending radially from said port to the exterior of said seat, for communication with a source of lubricant under pressure remote from said seat; a loose plug for closing the end of the bearing remote from said seat; and means for clamping said bearing and plug in cooperative relation with said seat, including a locking bar opposed to said seat and hingedly supported at one end, and a latch for engagement with the other end of said bar.

3. In a lubricant dispensing apparatus; a seat affording a plane support for a bearing to be lubricated, and having a lubricant inlet port; a lubricant supply conduit extending from said port to the exterior of said seat; a loose plug for closing the end of the bearing remote from said seat; means for clamping said bearing and plug in cooperative relation with said seat, including a locking bar opposed to said seat and hingedly supported at one end; a latch pivoted adjoining said seat and having means for engaging the opposite end of said bar; a plunger mounted to reciprocate in said bar in coaxial relation with said seat; and means for thrusting said plunger toward said seat to clamp said bearing and plug in cooperative relation with said seat.

4. In a lubricant dispensing apparatus; a seat affording a plane support for a bearing to be lubricated, and having a lubricant inlet port; a lubricant supply conduit extending from said port to the exterior of said seat; a loose plug for closing the end of the bearing remote from said seat; means for clamping said bearing and plug in cooperative relation with said seat, including a locking bar opposed to said seat and hingedly supported at one end; a latch pivoted adjoining said seat and having means for engaging the opposite end of said bar; a plunger mounted to reciprocate in said bar in coaxial relation with said seat; and means for thrusting said plunger toward said seat to clamp said bearing and plug in cooperative relation with said seat, including a cam mounted to rotate in opposition to the outer end of said plunger, and a lever for turning said cam.

5. In a lubricant dispensing apparatus; a seat affording a plane support for a bearing to be lubricated, and having a lubricant inlet port; a lubricant supply conduit extending from said port to the exterior of said seat; a loose plug for closing the end of the bearing remote from said seat; means for clamping said bearing and plug in cooperative relation with said seat, including a locking bar opposed to said seat and hingedly supported at one end; a latch pivoted adjoining said seat and having means for engaging the opposite end of said bar; a plunger mounted to reciprocate in said bar in coaxial relation with said seat; means for thrusting said plunger toward said seat to clamp said bearing and plug in cooperative relation with said seat; and means for adjusting the hinge of said locking bar toward and away from said seat in accordance with the axial length of the bearing to be lubricated.

6. In a lubricant dispensing apparatus, a seat affording a plane support for a bearing to be lubricated, and having a lubricant inlet port; a lubricant supply conduit extending from said port to the exterior of said seat; a loose plug for closing the end of the bearing remote from said seat; means for clamping said bearing and plug in cooperative relation with said seat, including a locking bar opposed to said seat and hingedly supported at one end; a latch pivoted adjoining said seat and having means for engaging the opposite end of said bar; a plunger mounted to reciprocate in said bar in coaxial relation with said seat; means for thrusting said plunger toward said seat to clamp said bearing and plug in cooperative relation with said seat; and means for adjusting the hinge of said locking bar toward and away from said seat in accordance with the axial length of the bearing to be lubricated, including a screw threaded member fitted for axial adjustment in a screw socket in fixed relation with said seat.

7. In a lubricant dispensing apparatus, a seat affording a support for a bearing to be lubricated, extending in a plane at right angles to the axis of the bearing, and having a lubricant inlet port; a lubricant supply conduit extending from said port to the exterior of said seat; means for closing the end of the bearing remote from said seat; means for clamping said bearing and its closing means in cooperative relation with said seat, including a locking bar opposed to said seat and hingedly supported at one end, and a latch pivoted adjoining said seat and having means for engaging the opposite end of said bar with the latter at different distances from said seat.

8. In a lubricant dispensing apparatus, a seat affording a support for a bearing to be lubricated, extending in a plane at right angles to the axis of the bearing, and having a lubricant inlet port; a lubricant supply conduit extending from said port to the exterior of said seat; means for clamping said bearing in cooperative relation with said seat, including a locking bar opposed to said seat and hingedly supported at one end, and a latch pivoted adjoining said seat and having means, including a series of notches, for engaging the opposite end of said bar with the latter at different distances from said seat.

9. In a lubricant dispensing apparatus; a seat affording a support for a bearing to be lubricated and having a valve controlled lubricant inlet port; a lubricant supply conduit extending radially from said port to the exterior of said seat, for communication with a source of lubricant under pressure remote from said seat; means for closing the end of the bearing remote from said seat; and means for clamping said bearing in cooperative relation with said seat.

10. In a lubricant dispensing apparatus; a seat affording a support for a bearing to be lubricated and having a valve controlled lubricant inlet port; a lubricant supply conduit extending from said port to the exterior of said seat, for communication with a source of lubricant under pressure remote from said seat, means for closing the end of the bearing remote from said seat; and means for clamping said bearing in cooperative relation with said seat.

11. In a lubricant dispensing apparatus; a seat affording a support for a bearing to be lubricated and having a valve controlled lubricant inlet port; a lubricant supply conduit extending from said port, for communication with a source of lubricant under pressure; means closing the end of the bearing remote from said seat; and means for clamping said bearing in cooperative relation with said seat.

12. A bearing packing device, comprising a member having a substantially central chamber, a surface surrounding said chamber and adapted to uniformly contact with one side of a bearing, means to lead lubricant under pressure into said chamber, with a clamping element having a substantially conical surface adapted to contact with the opposite side of such bearing, said last-mentioned means comprising a relatively movable member pivotally connected to said first-mentioned member and loosely carrying said clamping element, and an eccentrically mounted compression member also carried by said relatively movable member, and operative to force said clamping element firmly towards said first-named member, to clamp a bearing between said surfaces.

13. In a lubricant dispensing apparatus; a seat affording a support for a bearing to be lubricated, and having a lubricant inlet port; a lubricant supply conduit extending radially from said port to the exterior of said seat, for communication with a source of lubricant under pressure remote from said seat; a loose plug for closing the end of the bearing remote from said seat; and means for clamping said bearing and plug in cooperative relation with said seat, including a locking bar opposed to said seat and hingedly supported at one end, and a latch for engagement with the other end of said bar.

14. In a lubricant dispensing apparatus; a seat affording a support for a bearing to be lubricated, and having a lubricant inlet port; a lubricant supply conduit extending radially from said port to the exterior of said seat, for communication with a source of lubricant under pressure remote from said seat; a loose plug for closing the end of the bearing remote from said seat; and means for clamping said bearing and plug in cooperative relation with said seat.

15. In a lubricant dispensing apparatus; a seat affording a plane support for a bearing to be lubricated, and having a lubricant inlet port; a lubricant supply conduit extending from said port to the exterior of said seat, for communication with a source of lubricant under pressure remote from said seat; a loose plug for closing the end of the bearing remote from said seat; and means for clamping said bearing and plug in cooperative relation with said seat.

16. In a device for applying pressure fluid to bearings, means for holding fluid, a head adapted to receive an annular roller bearing, a stationary stem, a clamp mounted on said stationary stem for adjustment with respect to said head for holding the bearing thereagainst, means forming communication between the fluid holding means and the interior of said bearing, and means operable independently of said clamping means to force fluid into said bearing.

17. In a lubricant dispensing apparatus; a seat affording a support for a bearing to be lubricated, and having a lubricant inlet port; a lubricant supply conduit extending radially from said port to the exterior of said seat, for communication with a source of lubricant under pressure remote from said seat; and means for clamping said bearing in cooperative relation with said seat.

18. In a lubricant dispensing apparatus; a seat affording a plane support for a bearing to be lubricated, and having a lubricant inlet port; a lubricant supply conduit extending from said port to the exterior of said seat, for communication with a source of lubricant under pressure remote from said seat; and means for clamping said bearing in cooperative relation with said seat.

CHARLES A. GREEN.